US009831740B2

(12) United States Patent
Lee et al.

(10) Patent No.: US 9,831,740 B2

(45) Date of Patent: Nov. 28, 2017

(54) UNIVERSAL MOTOR ADAPTOR FOR LEAD POWER CABLE CONNECTION SYSTEMS

(71) Applicant: Alkhorayef Petroleum Company Limited, Al Khobar (SA)

(72) Inventors: Woon Yung Lee, Sugar Land, TX (US); Ying Xue, Shanghai (CN); Jianyang Yi, Jiangxi (CN)

(73) Assignee: ALKHORAYEF PETROLEUM COMPANY LIMITED, Al Khobar (SA)

( * ) Notice: Subject to any disclaimer, the term of this patent is extended or adjusted under 35 U.S.C. 154(b) by 0 days.

(21) Appl. No.: 15/004,135

(22) Filed: Jan. 22, 2016

(65) Prior Publication Data

US 2017/0070119 A1 Mar. 9, 2017

Related U.S. Application Data

(63) Continuation of application No. 14/844,271, filed on Sep. 3, 2015, now abandoned.

(51) Int. Cl.

| | |
|---|---|
| ***H02K 5/22*** | (2006.01) |
| ***E21B 43/12*** | (2006.01) |
| ***H02K 5/132*** | (2006.01) |
| ***H02K 11/00*** | (2016.01) |

(52) U.S. Cl.

CPC ............. *H02K 5/22* (2013.01); *E21B 43/128* (2013.01); *H02K 5/132* (2013.01); *H02K 5/225* (2013.01); *H02K 11/0094* (2013.01)

(58) Field of Classification Search

CPC ...... H01R 13/523; H02K 5/132; H02K 5/225; E21B 17/025; E21B 17/028; E21B 43/128; F04D 13/10

See application file for complete search history.

(56) References Cited

U.S. PATENT DOCUMENTS

| | | | | |
|---|---|---|---|---|
| 2,283,117 A * | 5/1942 | Arutunoff | E21B 17/025 | 174/109 |
| 3,308,316 A * | 3/1967 | Pfahl | H01B 17/306 | 174/18 |
| 4,128,735 A * | 12/1978 | Zehren | H02K 5/225 | 174/23 R |
| 4,524,834 A * | 6/1985 | Barron | E21B 17/025 | 166/385 |
| 7,261,155 B1 * | 8/2007 | Ward | E21B 17/025 | 166/117.5 |
| 8,997,852 B1 * | 4/2015 | Lee | F04B 47/06 | 166/105 |
| 2006/0222529 A1 * | 10/2006 | Watson | F04D 13/021 | 417/414 |
| 2007/0224057 A1 * | 9/2007 | Swatek | F04D 13/10 | 417/414 |
| 2009/0317997 A1 * | 12/2009 | Watson | E21B 17/023 | 439/190 |
| 2013/0309888 A1 * | 11/2013 | Nicholson | E21B 17/025 | 439/271 |

(Continued)

*Primary Examiner* — Kipp C Wallace

(74) *Attorney, Agent, or Firm* — Jones Day

(57) ABSTRACT

An electrical submersible pumping system includes production tubing, a pump for pumping fluid through the production tubing, a motor for providing power to the pumping system, an electrical cable for supplying power to the motor, and a motor adaptor attached to the motor for connecting the electrical cable to the motor.

19 Claims, 7 Drawing Sheets

200 221 203 211 210 211 201 230 231 202 208 204 205 207 222 206

(56) References Cited

U.S. PATENT DOCUMENTS

2014/0042835 A1* 2/2014 Holzmueller .......... H02K 5/124
310/43
2016/0097243 A1* 4/2016 Noakes ................ E21B 17/028
166/105

* cited by examiner

UNIVERSAL MOTOR ADAPTOR FOR LEAD POWER CABLE CONNECTION SYSTEMS

CROSS-REFERENCE TO RELATED APPLICATIONS

This application is a continuation of U.S. patent application Ser. No. 14/844,271, filed Sep. 3, 2015, which is hereby incorporated by reference in its entirety for all purposes.

STATEMENT REGARDING FEDERALLY SPONSORED RESEARCH OR DEVELOPMENT

Not applicable.

BACKGROUND

1. Field

The following description relates to a universal motor adaptor located at the top of a motor head and lower part of motor protector system. The motor adaptor will receive electrical power through a protected cable for three phases from a surface power supply and transmit this power to a motor. For example, this will adopt separated phase connection terminals for three electrical cable leads to an Electrical Submersible Pump (ESP) motor, which provides a more reliable electrical connection.

2. Description of Related Art

In submergible crude oil pumping systems, the system's components including the pump, motor, tubing, and related mechanical features are disposed within a well casing in a bore hole typically in or beneath the oil well underground, commonly at distances from one to two kilometers under the earth's surface.

It is quite common for some of this equipment to break down during operation, requiring work stoppage and repair, or the introduction of new pumping systems into the bore hole. Engineers and oil service companies are constantly reviewing pumping systems and related operations to improve their efficiency and reliability.

In a typical application, ESP systems will be installed at the lower end of tubing string in a casing of well. The ESP system is powered through a power cable attached to the tubing from the surface to the down hole motor. The power cable is typically connected to the motor via an electrical connector, which is located at the end of the power cable. The connector is designed functionally for the power transmission and sealing between well fluid and motor oil. Due to the harsh down hole environment, the connector has been one of the major parts for system reliability.

Traditionally, ESP motors use a motor lead extension to supply electrical power. Motor lead extensions include the flat cable with three conductors wrapped by metal armor and a pothead type of connection flange at the end of the cable. The ESP motor is equipped with a connection port at the head part of the motor for motor lead extension. Due to the limited space, a compact design for a motor lead extension access to the side of the motor head is desired. Even though this type of connection has been used in most ESP applications, a high percentage of failures is typical.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In an aspect, an electrical submersible pumping system includes production tubing, a pump for pumping fluid through the production tubing, a motor for providing power to the pumping system, an electrical cable for supplying power to the motor, and a motor adaptor attached to the motor for connecting the electrical cable to the motor.

In another aspect, a motor adaptor for use with a motor of an electrical submersible pumping system includes phase connection terminals that provide an electrical connection to the motor, wherein the motor adaptor is configured to receive an electrical cable of the submersible pumping system for connecting the electrical cable to the motor.

In yet another aspect, a method of connecting a motor of an electrical submersible pumping system to an electrical cable for providing power to the motor, comprising connecting a motor adaptor to the motor, and attaching the electrical cable to the motor adaptor, wherein the connecting of the motor adaptor to the motor comprises connecting conductor terminals of the motor adaptor to the motor.

BRIEF DESCRIPTION OF THE DRAWINGS

The foregoing summary, as well as the following detailed description, will be better understood when read in conjunction with the appended drawings. For the purpose of illustration, certain examples of the present description are shown in the drawings. It should be understood, however, that the invention is not limited to the precise arrangements and instrumentalities shown. The accompanying drawings, which are incorporated in and constitute a part of this specification, illustrate an implementation of system, apparatuses, and methods consistent with the present description and, together with the description, serve to explain advantages and principles consistent with the invention.

Figure 1:
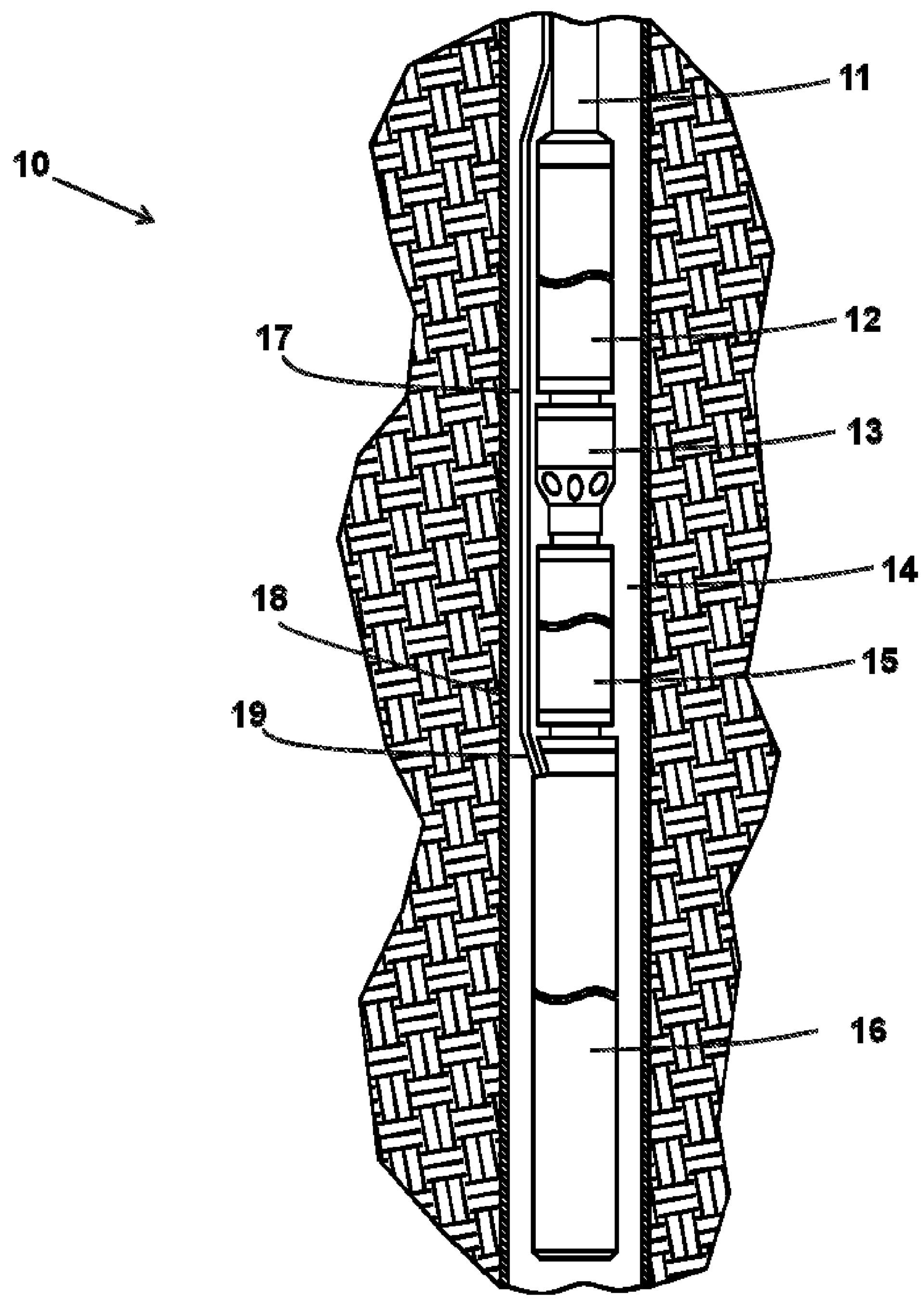
FIG. 1 is a diagram illustrating a prior art electric submergible pumping system. The pumping system includes production tubing, pump, pump intake, motor, motor protector, and an electrical connector that connects an electrical cable to the motor.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

In addition, it is to be understood that the phraseology and terminology employed herein are for the purpose of description and should not be regarded as limiting. For example, the use of a singular term, such as, "a" is not intended as limiting of the number of items. Also the use of relational terms, such as but not limited to, "top," "bottom," "left," "right," "upper," "lower," "down," "up," "side," are used in the description for clarity and are not intended to limit the scope of the invention or the appended claims. Further, it should be understood that any one of the features can be used separately or in combination with other features. Other systems, methods, features, and advantages of the invention will be or become apparent to one with skill in the art upon examination of the detailed description. It is intended that all such additional systems, methods, features, and advantages be included within this description, be within the scope of the present invention, and be protected by the accompanying claims.

FIG. 1 is a diagram illustrating an example of a prior art electric submergible pumping system 10. The pumping system 10 includes production tubing 11, a pump 12, a pump intake 13, a motor 16, a motor protector 15, and an electrical connector 19 that connects an electrical cable 17 to the motor 16.

As illustrated in this prior art example, the electrical submergible pumping system 10 is within a wellbore 14 and wellbore casing 18 in a geological formation. The ESP system 10 is powered through an electrical cable 17 attached to the tubing 11 from the surface to the down hole motor 16. The electrical cable 17 is connected to the motor 16 via an electrical connector 19, which is located at the end of the electrical cable 17. The electrical connector 19 is designed functionally for the power transmission and sealing between well fluid and motor oil.

The motor 16 may include a motor lead extension to supply electrical power, and the motor lead extension may include a flat cable with three conductors wrapped by metal armor and a pothead type of connection flange at the end of the cable. The motor 16 may be equipped with a connection port at the head part for the motor lead extension.

Figure 2:
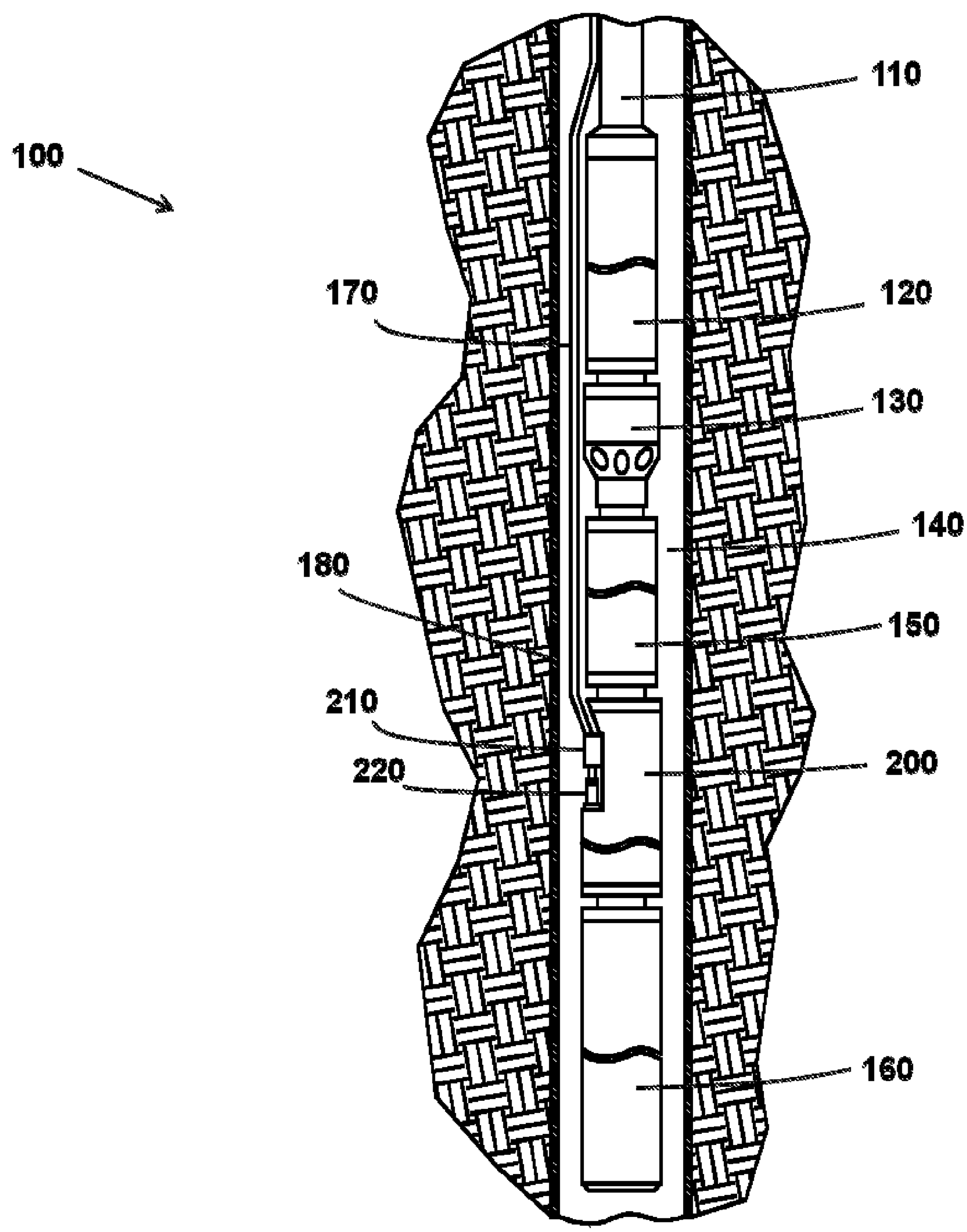
FIG. 2 is a diagram illustrating an example of an electrical submergible pumping system including a universal motor adaptor assembly for connecting an electrical cable to a motor.

FIG. 2 is a diagram illustrating an example of an electrical submergible pumping system 100 including a universal motor adaptor assembly 200. Similar to the pumping system 10 shown in FIG. 1, the pumping system 100 includes production tubing 110, a pump 120, a pump intake 130, a motor 160, and a motor protector 150. The pumping system 100 also includes the universal motor adaptor assembly 200 for connecting an electrical cable 170 to the motor 160. As used throughout this application including the claims, a motor adaptor means a housing which is not a motor and does not include a rotor or a stator.

The universal motor adaptor assembly 200 includes a cable clamp 210 that clamps electrical conductors 221 to the universal motor adaptor assembly 200. The cable clamp 210 is attached to the universal motor adaptor assembly 200 using screws 211. The universal motor adaptor assembly 200 also includes a motor individual lead connector system 220 for three individual conductor lead wires 224. The universal motor adaptor assembly 200 and its components will be discussed in greater detail in correspondence with FIGS. 3-7.

Figure 3:
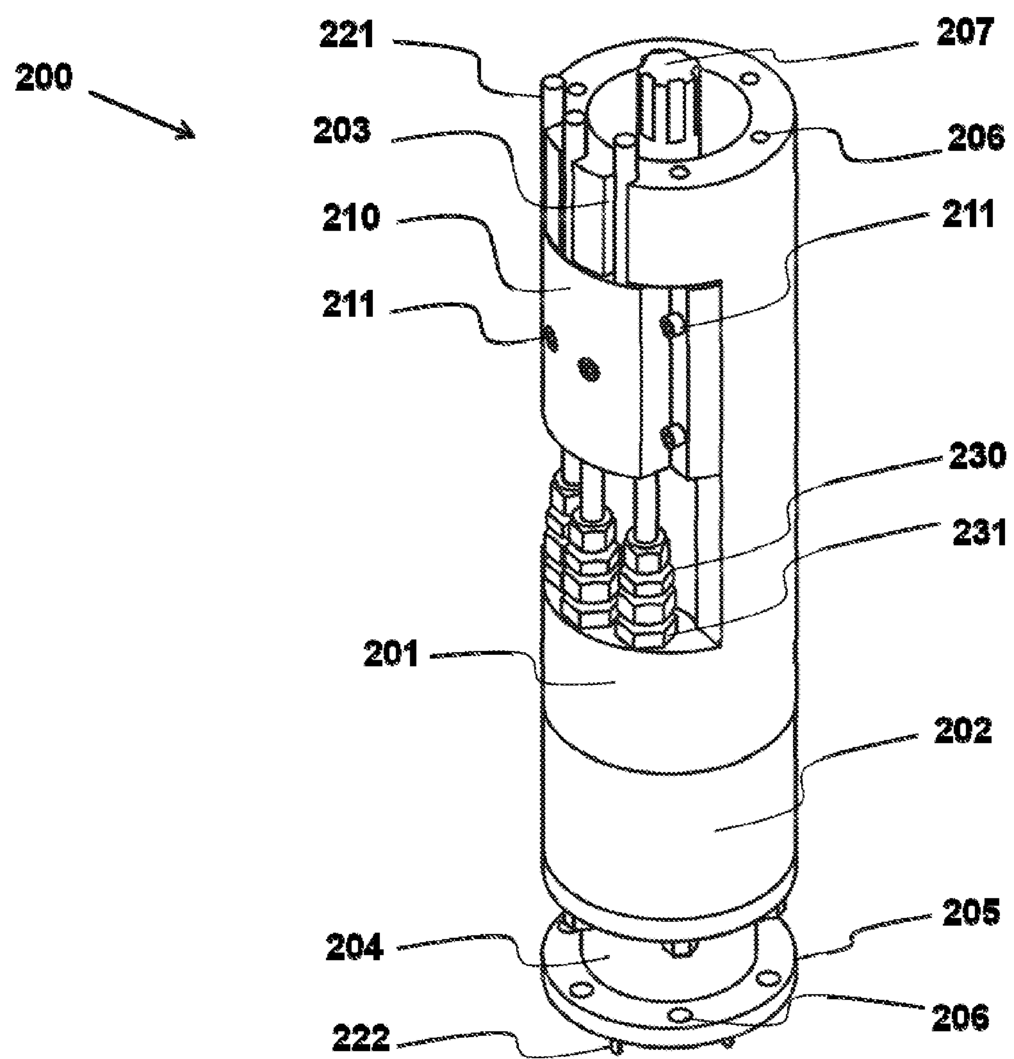
FIG. 3 is a diagram illustrating an example of a top perspective view of a universal motor adaptor for connection to a motor and for use in an electrical submergible pumping system.

Referring to FIG. 3, the universal motor adaptor assembly 200 includes the universal motor adaptor body 201, the universal motor adaptor housing 202, connector grooves 203 formed in the upper portion of the adaptor assembly 200, and an adaptor base 204 at the lower portion of the adaptor assembly 200. The adaptor base 204 includes a motor connection flange 205 for connecting the adaptor assembly 200 to the motor 160. Also, bolt holes 206 are formed in the upper portion of the adaptor body 201 and at the motor connection flange 205 for connecting the adaptor assembly to adjacent structures. In addition, the universal motor adaptor assembly 200 includes a shaft 207 that vertically extends through the center axis of the adaptor assembly 200.

The conductor grooves 203 are configured to receive electrical conductors 221 that extend through the universal motor adaptor assembly 200 for powering the motor 160. The electrical conductors 221 extend through a tube union assembly 230 and compression screws 231 for connecting the electrical conductors 221 to adaptor lead conductors or lead wires 224. The lead wires 224 terminate at conductor terminals 222 formed at a bottom portion of the motor connection flange 205. A detailed discussion of the electrical conductors 221, the lead wires 224, the tube union assembly 230, and the compression screws 231 is provided in connection with FIG. 7.

Figure 4:
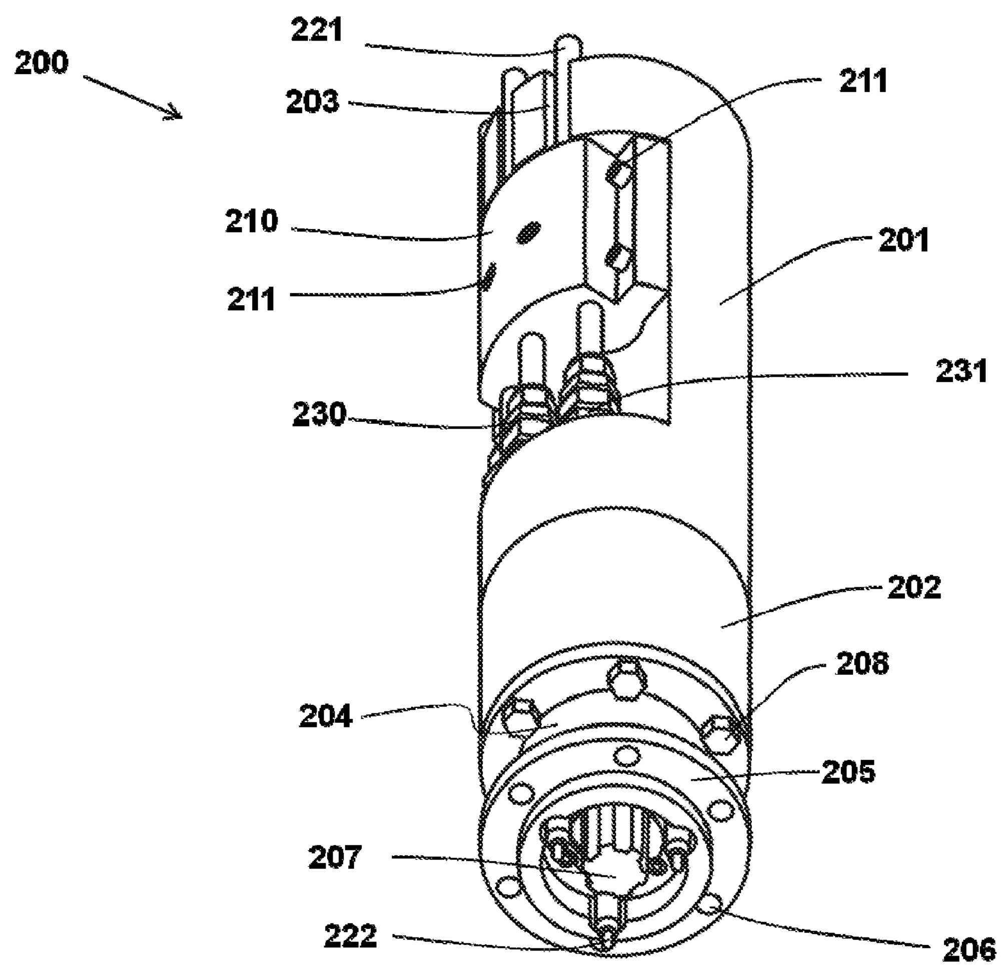
FIG. 4 is a diagram illustrating an example of a bottom perspective view of a universal motor adaptor for connection to a motor and for use in an electrical submergible pumping system.

FIG. 4 is a diagram illustrating an example of the universal motor adaptor assembly 200 from a bottom perspective view. As illustrated in FIG. 4, the adaptor base 204 is attached to the motor adaptor housing 202 using bolts 208. The adaptor base 204 extends vertically downwards, and the motor connection flange 205 extends outwardly therefrom. The conductor terminals 222 extend from the bottom of the motor connection flange 205. In this example, three conductor terminals 222 corresponding with the three electrical conductors 221 and the three lead wires 224 extend from the bottom of the motor connection flange 205.

Figure 5:
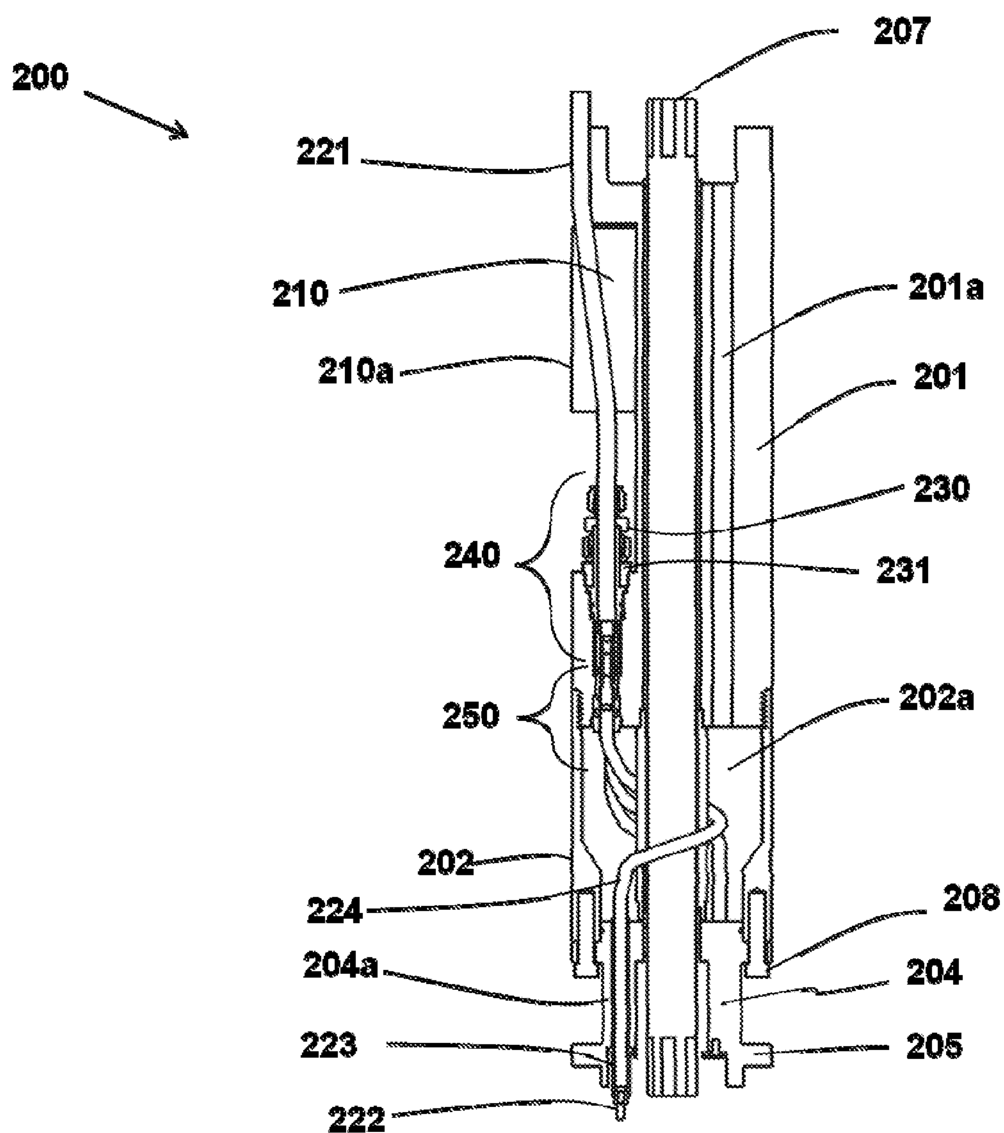
FIG. 5 is a diagram illustrating an example of a side cross-sectional view of a universal motor adaptor for connection to a motor and for use in an electrical submergible pumping system.

Referring to FIG. 5, a cross-sectional view of the adaptor assembly 200 is illustrated. The adaptor assembly 200 includes a vertical hole 201*a* that extends through the universal motor adaptor body 201, and a hollow space 202*a* within the motor adaptor assembly 202. Also, the cable clamp 210 discussed above includes a cable clamp cover 210*a* on an upper portion of the clamp 210. The connection between the electrical conductors 221 and lead wires 224 is illustrated; specifically, the connection includes an upper connector section 240 and a lower connector section 250. The upper connector section 240 and the lower connector section 250 are discussed in more detail in reference with FIG. 7. The adaptor base 204 includes a wire passage 204*a* that receives a guide tube 223 that guides the lead wires 224 to the conductor terminals 222.

Figure 6:
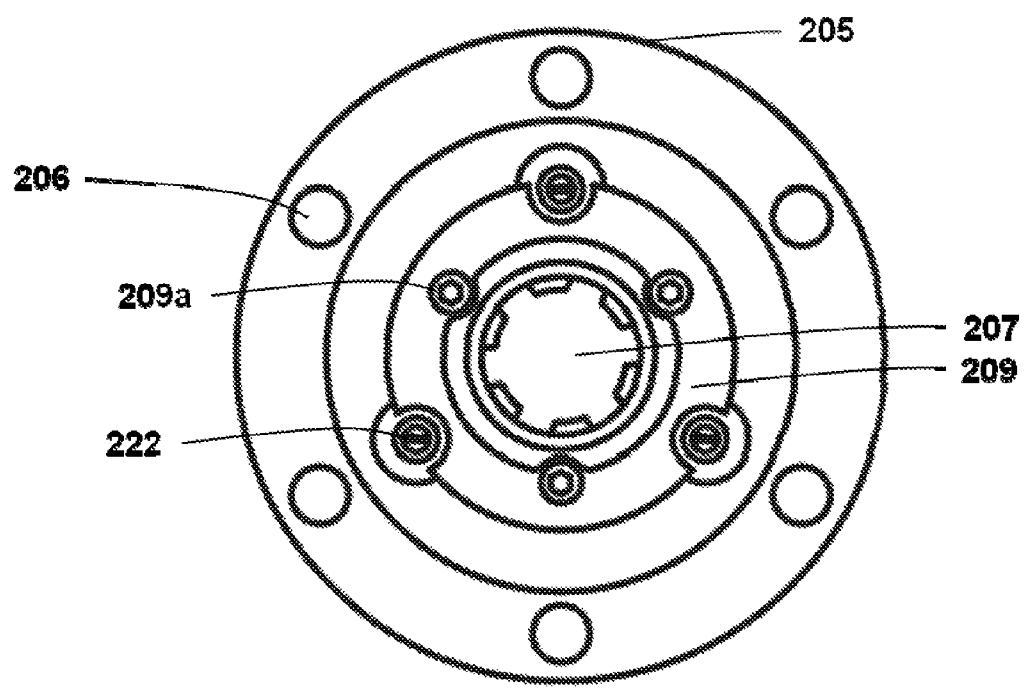
FIG. 6 is a diagram illustrating an example of a bottom elevation view of a motor head connection flange of a universal motor adaptor for connection to a motor.

FIG. 6 is a diagram illustrating an example of a bottom elevation view of the motor head connection flange 205 including the bolt holes 206, the shaft 207, and the conductor terminals 222. The motor head connection flange 205 also includes a terminal fixing plate 209 and terminal fixing screws 209*a* for fixing the terminal fixing plate 209.

Figure 7:
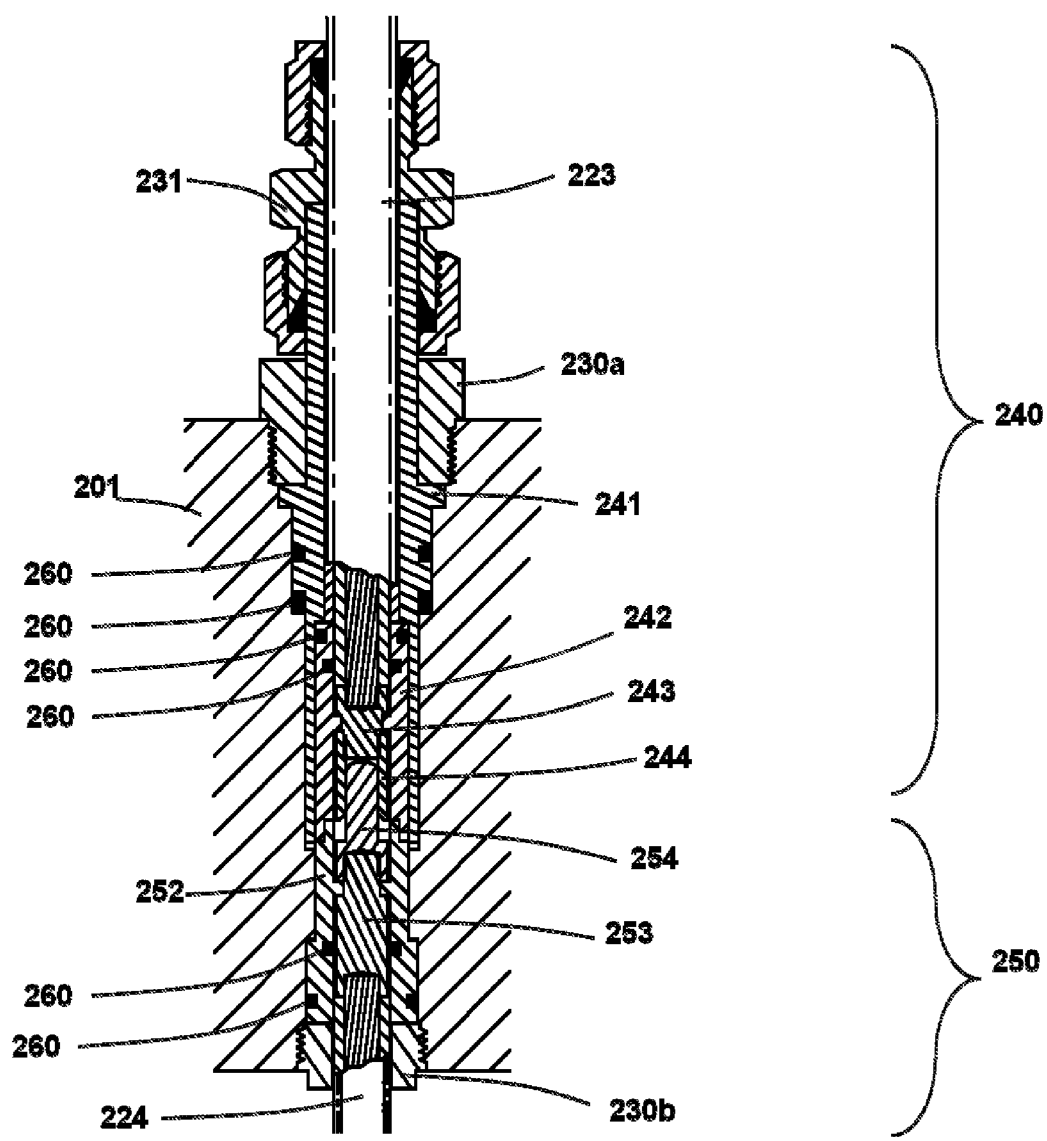
FIG. 7 is a diagram illustrating an upper connector section and a lower connector section of a universal motor adaptor for use in an electrical submergible pumping system.

FIG. 7 is a diagram illustrating the upper connector section 240 and the lower connector section 250 of the universal motor adaptor 200 for use in the ESP system 100. Referring to FIG. 7, each of the electrical conductors 221 includes a metal tube 223 that covers the electrical conductors on an outside portion thereof. The upper connector section 240 and the lower connector section 250 connect the electrical conductors 221 at the upper portion of the adaptor body 201 to the lead wires 224 at the bottom portion of the adaptor body 201.

The upper connector section 240 includes the tube union assembly 231, the upper compression screw 230*a*, a conductor sealing body 241 for sealing the metal tube 223 of the electrical conductor 221, an upper insulation tube 242 for electrically insulating an upper terminal adapter 243 and a female terminal 244 of the electrical conductors 221. The upper terminal adapter 243 extends though the female terminal 244 of the upper connector section 240. The lower connector section 250 includes the lower compression screw 230*b*, a lower insulation tube 252 for electrically insulating a lower terminal adapter 253 and a male terminal 254 of the lead wire 224. The lower terminal adapter 253 extends though the male terminal 254 of the lower connector section 250. Accordingly, the electrical conductors 221 are connected to the lead wires 224 through the male terminal 254 of the lower connector section 250 being connected to the female terminal 244 of the upper connector section 240.

One of skill in the art will recognize that the described examples are not limited to any particular size. Further one of skill in the art will recognize that the components of the universal motor adaptor 200 are not limited to any type of material. One skilled in the art will recognize that diameters, types and thicknesses of preferred materials can be utilized when taking into consideration safety and the high pressure functioning capacity which can range during operation. A number of manufacturing techniques may be used such as the machining or casting of any component of the universal motor adaptor 200.

It will be appreciated by those skilled in the art that changes could be made to the embodiments described above without departing from the broad inventive concept thereof. It is understood, therefore, that the invention disclosed herein is not limited to the particular embodiments disclosed, and is intended to cover modifications within the spirit and scope of the present invention.

What is claimed is:

1. An electrical submersible pumping system, comprising:

production tubing;

a pump for pumping fluid through the production tubing;

a motor for providing power to the pumping system comprising upper female terminals;

an electrical cable comprising two or more electrical conductors and two or more lead wires for supplying power to the motor; and a motor adaptor attached to the motor for connecting the electrical cable to the motor, the motor adaptor comprising:

a shaft that vertically extends through a center axis of the motor adaptor;

a hollow space that is formed around a circumference of the shaft, a tube union assembly receiving the two or more electrical conductors at a first end of the motor adaptor, ends of the assembly forming a less than 180° angle with respect to the center axis, and male conductor terminals evenly distributed about the center axis, the male conductor terminals providing an electrical connection to the motor at a second end of the motor adaptor, wherein the male conductor terminals of the motor adaptor protrude outwardly from the motor adaptor and are received by the upper female terminals of the motor so that the motor is configured to be electrically connected to the motor adaptor in response to the motor adaptor being positioned on the motor and without adjusting a position of the male conductor terminals with respect to the motor adaptor or a position of the upper female terminals with respect to the motor, wherein the two or more electrical conductors are disposed above the hollow space, and the two or more lead wires are disposed within the hollow space of the motor adaptor and wrap around the shaft, the lead wires being electrically connected to the conductor terminals at the second end of the motor adaptor.

2. The electrical submersible pumping system of claim 1, wherein the motor adaptor comprises a cable clamp, and the one or more electrical conductors are clamped to the motor adaptor using the cable clamp.

3. The electrical submersible pumping system of claim 1, wherein the motor adaptor further comprises grooves formed in a body of the motor adaptor for receiving the electrical conductors.

4. The electrical submersible pumping system of claim 1, wherein the motor adaptor comprises an adaptor base and a motor connection flange that connects the motor adaptor to the motor.

5. The electrical submersible pumping system of claim 4, wherein the electrical cable comprises electrical conductor phase terminals that are formed at a bottom portion of the motor connection flange.

6. The electrical submersible pumping system of claim 1, wherein the electrical cable comprises two or more electrical conductors, and the two or more electrical conductors and the two or more lead wires are connected within a body of the motor adaptor.

7. The electrical submersible pumping system of claim 6, further comprising an upper connection section and a lower connection section each comprising a compression screw and an insulation tube, the upper connection section being attached to the two or more electrical conductors and the lower connection section being attached to the two or more lead wires.

8. The electrical submersible pumping system of claim 7, wherein the upper connection comprises a male or female terminal and the lower connection comprises a female or male terminal, and the male or female terminal of the upper connection is attached to the female or male terminal of the lower connection.

9. The electrical submersible pumping system of claim 1, wherein the two or more electrical conductors comprise three electrical conductors and the two or more lead wires comprise three lead wires, and the phase connection terminals comprise three phase connection terminals; and wherein the three lead wires are arranged around the hollow space so that the three phase connection terminals are evenly spaced with respect to the center axis about a bottom surface of the motor adaptor.

10. A motor adaptor for use with a motor of an electrical submersible pumping system, comprising:

male conductor terminals that provide an electrical connection to the motor;

a shaft that vertically extends through a center axis of the motor adaptor; and a hollow space that is formed around a circumference of the shaft, wherein the motor adaptor has a receiving assembly configured to receive an electrical cable of the submersible pumping system in the hollow space for connecting the electrical cable to the motor; and wherein, with respect to the center axis, ends of the receiving assembly form a less than 180° angle, and the male conductor terminals are evenly spaced about the center axis at a bottom surface of the motor adaptor, wherein the male conductor terminals of the motor adaptor protrude outwardly from the motor adaptor and are received by upper female terminals of the motor so that the motor is configured to be electrically connected to the motor adaptor in response to the motor adaptor being positioned on the motor and without adjusting a position of the male conductor terminals with respect to the motor adaptor or a position of the upper female terminals with respect to the motor.

11. The motor adaptor of claim 10, wherein the electrical cable comprises electrical conductors, the motor adaptor comprises a cable clamp, and the electrical conductors are clamped to the motor adaptor.

12. The motor adaptor of claim 10, further comprising grooves formed in a body of the motor adaptor for receiving the electrical conductors.

13. The motor adaptor of claim 10, further comprising an adaptor base and a motor connection flange that connects the motor adaptor to the motor.

14. The motor adaptor of claim 13, wherein the phase connection terminals are formed at a bottom portion of the motor connection flange.

15. The motor adaptor of claim 10, wherein the electrical cable comprises an electrical conductor and a lead wire, and the electrical conductor and the lead wire are connected within a body of the motor adaptor.

16. The motor adaptor of claim 15, further comprising an upper connection section and a lower connection section each comprising a compression screw and an insulation tube, the upper connection section being attached to the electrical conductor and the lower connection section being attached to the lead wire.

17. The motor adaptor of claim 10, wherein the upper connection comprises a male or female terminal and the lower connection comprises a female or male terminal, and the male or female terminal of the upper connection is attached to the female or male terminal of the lower connection.

18. An electrical submersible pumping system, comprising:

production tubing;

a pump for pumping fluid through the production tubing;

a motor for providing power to the pumping system;

an electrical cable for supplying power to the motor and comprising at least two electrical conductors and at least two lead wires; and a motor adaptor attached to the motor for connecting the electrical conductors of the electrical cable to the lead wires of the electrical cable, the motor adaptor comprising:

a shaft that vertically extends through a center axis of the motor adaptor; and a hollow space that is formed around a circumference of the shaft, wherein the electrical conductors are disposed above the hollow space and, with respect to the center axis, form a less than 180° angle at a receiver assembly at a first end of the motor adaptor, and the lead wires are disposed within the hollow space of the motor adaptor and wrap around the shaft, and terminate at male conductor terminals at a second end of the motor adaptor, the terminals being distributed at substantially equal angles with respect to the center axis of the motor adaptor, wherein the male conductor terminals of the motor adaptor protrude outwardly from the motor adaptor and are received by upper female terminals of the motor so that the motor is configured to be electrically connected to the motor adaptor in response to the motor adaptor being positioned on the motor and without adjusting a position of the male conductor terminals with respect to the motor adaptor or a position of the upper female terminals with respect to the motor.

19. The electrical submersible pumping system of claim 18, wherein the electrical cable comprises three electrical conductors and three lead wires, and the motor adaptor comprises three phase connection terminals; and wherein the three lead wires are arranged around the hollow space so that the three phase connection terminals are evenly spaced with respect to the center axis about a bottom surface of the motor adaptor.

* * * * *